United States Patent
Anderson

(10) Patent No.: US 10,462,281 B2
(45) Date of Patent: Oct. 29, 2019

(54) TECHNOLOGIES FOR USER NOTIFICATION SUPPRESSION

(71) Applicant: Intel Corporation, Santa Clara, CA (US)

(72) Inventor: Glen J. Anderson, Beaverton, OR (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 15/638,803

(22) Filed: Jun. 30, 2017

(65) Prior Publication Data

US 2019/0007546 A1    Jan. 3, 2019

(51) Int. Cl.
| | |
|---|---|
| *H04M 1/725* | (2006.01) |
| *G01C 21/00* | (2006.01) |
| *G08B 7/06* | (2006.01) |
| *H04M 1/67* | (2006.01) |
| *G08B 25/00* | (2006.01) |
| *H04M 1/60* | (2006.01) |

(52) U.S. Cl.
CPC ........ *H04M 1/72569* (2013.01); *G01C 21/00* (2013.01); *H04M 1/72563* (2013.01); *G08B 7/06* (2013.01); *G08B 25/001* (2013.01); *H04M 1/6075* (2013.01); *H04M 1/67* (2013.01); *H04M 1/72577* (2013.01)

(58) Field of Classification Search
CPC ......... H04M 1/72569; H04M 1/72563; H04M 1/67; G08B 7/06; G08B 25/001
See application file for complete search history.

(56) References Cited

U.S. PATENT DOCUMENTS

| | | | | |
|---|---|---|---|---|
| 6,389,332 B1 * | 5/2002 | Hess | ...................... | G01C 21/26 701/1 |
| 6,661,345 B1 * | 12/2003 | Bevan | ..................... | G08B 21/06 340/575 |
| 8,700,102 B2 * | 4/2014 | Ferren | ................ | G02B 13/0065 455/567 |
| 8,776,149 B1 * | 7/2014 | Koch | ................ | H04N 21/4334 725/37 |
| 9,304,576 B2 | 4/2016 | Jackson et al. | | |
| 9,517,719 B2 * | 12/2016 | Lueke | ..................... | B60Q 1/38 |
| 2003/0212646 A1 * | 11/2003 | Horvitz | .................. | G06F 9/453 706/46 |
| 2007/0167850 A1 * | 7/2007 | Russell | ................ | A61B 5/0205 600/513 |

(Continued)

*Primary Examiner* — Mehmood B. Khan
(74) *Attorney, Agent, or Firm* — Barnes & Thornburg LLP

(57) ABSTRACT

Technologies for user notification suppression include a user notification controller that controls a presentation of notifications to a user. The user notification controller includes a user notification determiner that determines whether a user notification is to be presented to the user, a user activity analyzer that determines an activity of the user, and a notification suppressor. The notification suppressor determines whether the determined activity of the user is indicative of the user's knowledge of information included in the user notification prior to the presentation of the user notification to the user. In response to a determination that the determined activity of the user is indicative of the user's knowledge of the information included in the user notification, the notification suppressor suppresses the presentation of the user notification to the user.

22 Claims, 6 Drawing Sheets

(56) References Cited

U.S. PATENT DOCUMENTS

| | | | |
|---|---|---|---|
| 2007/0171788 A1* | 7/2007 | Yokoyama | G01C 21/3629 369/47.16 |
| 2007/0185647 A1* | 8/2007 | Nguegang | G08G 1/127 701/465 |
| 2008/0004793 A1* | 1/2008 | Horvitz | G08G 1/01 701/487 |
| 2008/0201419 A1* | 8/2008 | Hung | H04L 51/04 709/204 |
| 2010/0088692 A1* | 4/2010 | Rathi | G06F 8/65 717/171 |
| 2010/0324818 A1* | 12/2010 | Gellatly | G01C 21/3641 701/431 |
| 2013/0311925 A1* | 11/2013 | Denker | G06F 3/013 715/771 |
| 2014/0249722 A1* | 9/2014 | Hegemann | G08G 1/16 701/41 |
| 2015/0058324 A1* | 2/2015 | Kauwe | G06F 16/24575 707/722 |
| 2015/0232030 A1* | 8/2015 | Bongwald | B60R 1/00 348/115 |
| 2015/0271639 A1* | 9/2015 | Ziskind | H04W 4/021 455/456.1 |
| 2016/0061619 A1* | 3/2016 | Kishore | G01C 21/3602 701/400 |
| 2016/0117947 A1* | 4/2016 | Misu | G09B 9/04 |
| 2016/0188965 A1* | 6/2016 | McClure | G06K 9/00335 382/103 |
| 2017/0304682 A1* | 10/2017 | Zhang | A63B 24/0003 |
| 2017/0359798 A1* | 12/2017 | Bradley | H04L 51/24 |
| 2017/0368936 A1* | 12/2017 | Kojima | B60K 28/06 |
| 2018/0022359 A1* | 1/2018 | Gusenbauer | A61B 5/18 340/439 |
| 2018/0075364 A1* | 3/2018 | Stolarz | G06F 3/01 |
| 2018/0096501 A1 | 4/2018 | Anderson et al. | |
| 2018/0126074 A1* | 5/2018 | Davis | G16H 50/20 |

* cited by examiner

TECHNOLOGIES FOR USER NOTIFICATION SUPPRESSION

BACKGROUND

Many user devices and systems are configured to provide the user with user notifications, such as user instructions, advice, and/or information, during operation. Oftentimes, such systems will provide the user notifications regardless of the actions or knowledge of the user, which can interrupt the user needlessly in those cases in which the user is already aware of the information or otherwise complying with the instruction. For example, different user devices or systems may generate the same user notification (e.g., a weather alert), even though the user may have already been notified by another device.

A vehicle navigation system is one type of user system configured to provide user notifications (e.g., user instructions) to a user. To do so, many vehicle navigation systems provide voice instructions to the user while the user is operating the vehicle. However, typical vehicle navigation systems will provide such user instructions even after the user has already started to comply with such instructions (e.g., the user may have already started a turn prior the vehicle navigation system instructing the user to turn). In such situations, when the user already has knowledge of the navigation instruction, the presented navigation instruction may interrupt user without providing any benefit to the user.

BRIEF DESCRIPTION OF THE DRAWINGS

The concepts described herein are illustrated by way of example and not by way of limitation in the accompanying figures. For simplicity and clarity of illustration, elements illustrated in the figures are not necessarily drawn to scale. Where considered appropriate, reference labels have been repeated among the figures to indicate corresponding or analogous elements.

DETAILED DESCRIPTION OF THE DRAWINGS

Figure 1:
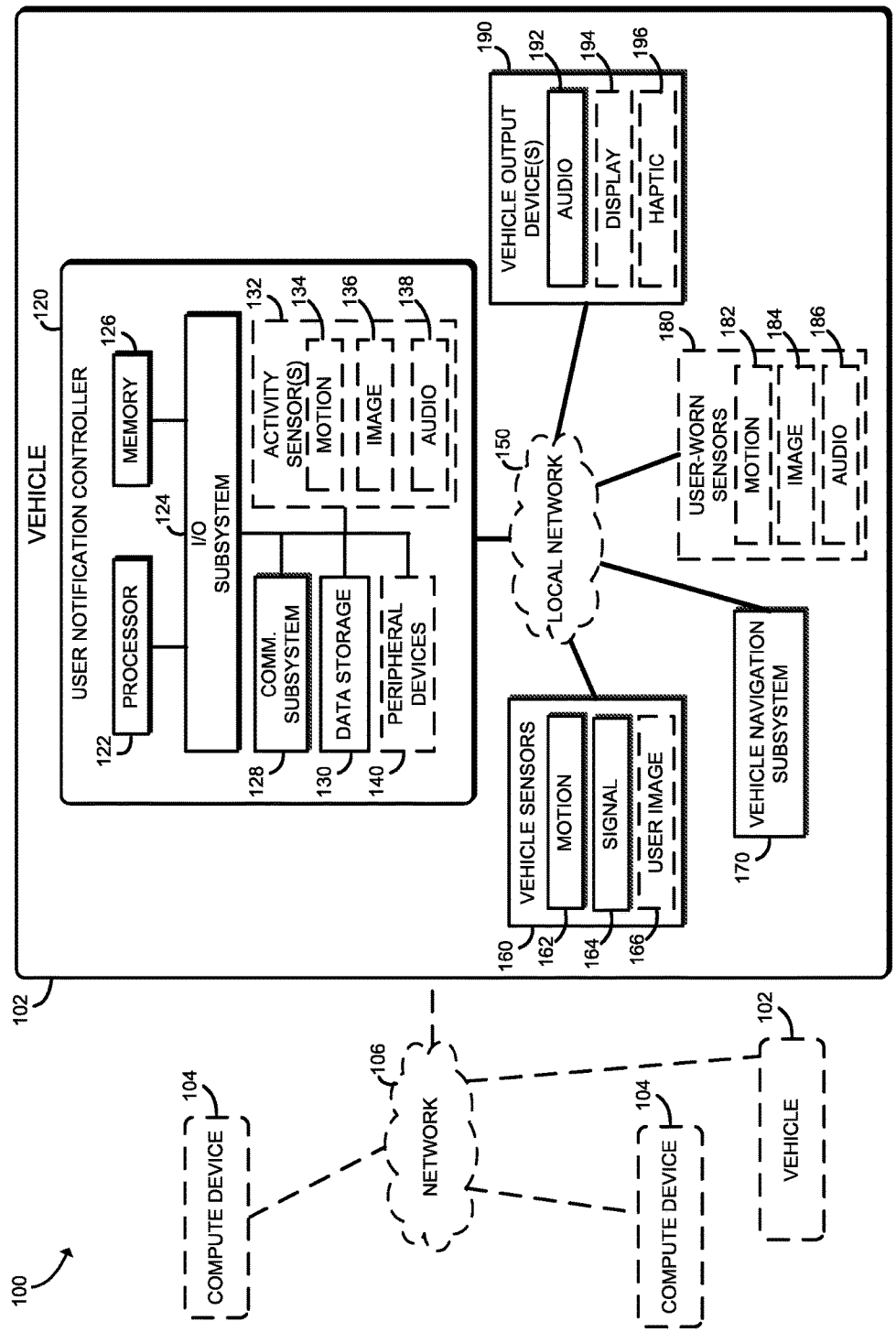
FIG. 1 is a simplified block diagram of at least one embodiment of a system for suppressing a presentation of a user notification to a user.

While the concepts of the present disclosure are susceptible to various modifications and alternative forms, specific embodiments thereof have been shown by way of example in the drawings and will be described herein in detail. It should be understood, however, that there is no intent to limit the concepts of the present disclosure to the particular forms disclosed, but on the contrary, the intention is to cover all modifications, equivalents, and alternatives consistent with the present disclosure and the appended claims.

References in the specification to "one embodiment," "an embodiment," "an illustrative embodiment," etc., indicate that the embodiment described may include a particular feature, structure, or characteristic, but every embodiment may or may not necessarily include that particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described. Additionally, it should be appreciated that items included in a list in the form of "at least one A, B, and C" can mean (A); (B); (C); (A and B); (A and C); (B and C); or (A, B, and C). Similarly, items listed in the form of "at least one of A, B, or C" can mean (A); (B); (C); (A and B); (A and C); (B and C); or (A, B, and C).

The disclosed embodiments may be implemented, in some cases, in hardware, firmware, software, or any combination thereof. The disclosed embodiments may also be implemented as instructions carried by or stored on a transitory or non-transitory machine-readable (e.g., computer-readable) storage medium, which may be read and executed by one or more processors. A machine-readable storage medium may be embodied as any storage device, mechanism, or other physical structure for storing or transmitting information in a form readable by a machine (e.g., a volatile or non-volatile memory, a media disc, or other media device).

In the drawings, some structural or method features may be shown in specific arrangements and/or orderings. However, it should be appreciated that such specific arrangements and/or orderings may not be required. Rather, in some embodiments, such features may be arranged in a different manner and/or order than shown in the illustrative figures. Additionally, the inclusion of a structural or method feature in a particular figure is not meant to imply that such feature is required in all embodiments and, in some embodiments, may not be included or may be combined with other features.

Referring now to FIG. 1, in an illustrative embodiment, a system 100 for suppressing a presentation of a user notification to a user (e.g., an operator) of a vehicle 102 includes a user notification controller 120. In use, as discussed in more detail below, the user notification controller 120 is configured to determine whether to present a user notification to the user based on activities of the user. The user notification may be embodied as any type of notification capable of providing information to the user. For example, the user notification may be embodied as a user instruction (e.g., a navigation instruction), a user alert (e.g., a traffic or weather warning), an informational notice (e.g., the present time), and/or other type of information for user consumption. The user notifications may originate from the user notification controller 120 itself or from other components or devices of the vehicle 102.

In the illustrative embodiment, the user notification controller 120 determines whether to suppress (i.e., not present) a user notification based on a determination that the user already has knowledge of the user notification. To do so, the user notification controller 120 infers the user's knowledge (e.g., compliance with a user instruction) based on the user's present and/or past activities. For example, in an embodiment in which the user notification is a navigation instruction (e.g., "turn left at the next intersection"), the user notification controller 120 may infer that the user is already aware of the upcoming left turn instruction based on the user activities, such as the user switching lanes to a turn lane, activating the left turn signal of the vehicle 102, turning her/his head toward the left, pressing the brake pedal, and so forth. Over time, the user notification controller 120 may "learn" the user's behavior via a machine-learning algorithm to improve the recognition of the user's knowledge of information included in a user notification prior to presentation of the user notification. Additionally, in some embodiments, the determination whether to suppress the new user notification may be dependent on the number and/or quality of detected user activities associated with the new user notification. If the user notification controller 120 suppresses a user notification, the user notification controller 120 may also send a suppress notification to other compute devices of the vehicle 102 or carried on the user (e.g., the user's smartphone) instructing those devices to suppress user notifications similar to or associated with the suppressed user notification.

In the illustrative embodiment, the vehicle 102 is embodied as an automobile (e.g., car or truck) capable of providing navigation information to a user (e.g., an operator of the vehicle 102). However, in other embodiments, the vehicle 102 may be embodied as any type of vehicle or machine capable of transporting an occupant including, but not limited to, a bus, a train, an airplane, a boat, a vehicle simulator, an amusement ride, a virtual reality environment, or any other machine, system, or environment configured to present a user notification (e.g., a navigation instruction) to a user of the vehicle 102. The vehicle 102 illustratively includes the user notification controller 120, one or more vehicle sensors 160, a vehicle navigation subsystem 170, and one or more vehicle output devices 190. In some embodiments, the vehicle 102 may further include one or more user-worn sensors 180. The user notification controller 120 may communicate with other components of the vehicle 102 over a local network 150 to determine user contexts and user activities to determine whether to suppress a user notification to the user as discussed in detail below.

The user notification controller 120 may be embodied as any type of computer or computing system capable of providing a user instruction to the user and performing the functions described herein. For example, in the illustrative embodiment, the user notification controller 120 is embodied as an in-vehicle compute device and, in some embodiments, may include or form a portion of a vehicle navigation system, an in-vehicle infotainment system, and/or other vehicle-based computing system. In other embodiments, the user notification controller 120 may instead be embodied as a stand-alone notification compute device (e.g., a personal compute device such as a smartphone) or computing system configured to interact with other systems of the vehicle 102. As illustratively shown in FIG. 1, the user notification controller 120 includes a processor 122, an input/output ("I/O") subsystem 124, a memory 126, a communication subsystem 128, and a data storage 130. Additionally, in some embodiments, the user notification controller 120 may include one or more activity sensors 132. It should be appreciated that the user notification controller 120 may include other or additional components, such as those commonly found in a compute device (e.g., various input/output devices and/or other components), in other embodiments. Additionally, in some embodiments, one or more of the illustrative components may be incorporated in, or otherwise form a portion of, another component. For example, the memory 126, or portions thereof, may be incorporated in the processor 122 in some embodiments (e.g., as a compute engine, a controller, a special purpose processor, etc.).

The processor 122 may be embodied as any type of processor capable of performing the functions described herein. For example, the processor 122 may be embodied as a single or multi-core processor(s), digital signal processor, microcontroller, or other processor or processing/controlling circuit. Similarly, the memory 126 may be embodied as any type of volatile or non-volatile memory or data storage capable of performing the functions described herein. In operation, the memory 126 may store various data and software used during operation of the user notification controller 120 such as operating systems, applications, programs, libraries, and drivers, depending on the implementation. The memory 126 is communicatively coupled to the processor 122 via the I/O subsystem 124, which may be embodied as circuitry and/or components to facilitate input/output operations with the processor 122, the memory 126, and other components of the user notification controller 120. For example, the I/O subsystem 124 may be embodied as, or otherwise include, memory controller hubs, input/output control hubs, firmware devices, communication links (i.e., point-to-point links, bus links, wires, cables, light guides, printed circuit board traces, etc.) and/or other components and subsystems to facilitate the input/output operations. In some embodiments, the I/O subsystem 124 may form a portion of a system-on-a-chip (SoC) and be incorporated, along with the processor 122, the memory 126, and other components of the user notification controller 120, on a single integrated circuit chip.

The communication subsystem 128 may be embodied as any type of communication circuit, device, or collection thereof, capable of enabling communications between the user notification controller 120 and other components of the vehicle 102 via a local network 150 and/or one or more separate compute devices 104 via a network 106 as discussed below. To do so, the communication subsystem 128 may be configured to use any one or more communication technologies (e.g., wireless or wired communications) and associated protocols (e.g., Ethernet, Bluetooth®, Wi-Fi®, WiMAX, LTE, 5G, etc.) to effect such communication.

The data storage 130 may be embodied as any type of device or devices configured for short-term or long-term storage of data such as, for example, memory devices and circuits, memory cards, hard disk drives, solid-state drives, or other data storage devices. In the illustrative embodiment, the user notification controller 120 may be configured to store vehicle information, context rules, user activity rules, and/or notification policies in the data storage 130 as discussed in more detail below.

The activity sensors 132 may be embodied as any type of sensor capable of generating data indicative of an activity of the user (e.g., a user action). For example, the activity sensors 132 may detect whether the user has turned on a turn signal, is tilting or twisting her head, is looking at the rearview mirror, is controlling a control (e.g., entertainment control) of the vehicle, and/or other action related to control of the vehicle. In the illustrative embodiment, the activity sensors 132 may include a motion sensor 134, an image sensor 136, and/or an audio sensor 138. The motion sensor(s) 134 may be embodied as any type of sensor capable of generating or producing sensor data indicative of a motion of the user or a portion of the user's body. For example, the motion sensor 134 may be embodied as an accelerometer or gyroscope. The image sensor(s) 136 may be embodied as any type of image sensor capable of capturing an image of the user or the user's environment (e.g., an environment of the vehicle 102). For example, the image sensor 136 may be embodied as a vehicle-mounted camera. The audio sensor(s) 138 may be embodied as any type of sensor capable of generating or producing sensor data indicative of a voice of the user or background noise surrounding the user. For example, the audio sensor may be embodied as a microphone or other audio capturing device. In some embodiments, the sensor data produced by the activity sensors 132 may be stored and analyzed to determine the activity of the user. It should be appreciated, however, that in the embodiments in which the user activity is rendered on a user-worn device, the activity sensors 132 may be embodied as a part of the user-worn sensors 180, which are discussed in detail below.

In some embodiments, the user notification controller 120 may also include one or more peripheral devices 140. The peripheral devices 140 may include any number of additional peripheral or interface devices, such as other input/output devices, storage devices, and so forth. The particular devices included in the peripheral devices 140 may depend on, for example, the type and/or configuration of the user notification controller 120.

As discussed above, the user notification controller 120 may be communicatively coupled to the one or more vehicle sensors 160, the vehicle navigation subsystem 170, and one or more user-worn sensors 180 in some embodiments to receive data therefrom. Each of the one or more vehicle sensors 160 may be embodied as any type of sensor coupled to or incorporated in the vehicle 102 and capable of producing sensor data from which a user activity of the user of the vehicle may be determined or otherwise inferred. Illustratively, the vehicle sensors 160 include one or more motion sensors 162, signal sensor 164, and a user image sensor 166 in some embodiments. The motion sensor(s) 162 may be embodied as any type of motion sensor capable of generating or producing sensor data indicative of a motion of the vehicle 102 initiated by the user. For example, the motion sensor 162 may be embodied as an accelerometer or gyroscope. It should be appreciated that the motion sensors 162 may include different types of motion sensors to detect different types of movement of the vehicle 102 initiated by the user. For example, one motion sensor 162 may detect turning of the vehicle 102, another motion sensor 162 may detect tilting of the vehicle 102, another motion sensor 162 may detect the present grade of the vehicle 102, etc. The signal sensor(s) 164 may be embodied as any type of signal sensor capable of generating or producing sensor data indicative of an activation of a signal of the vehicle, such as a left or right turning signal of the vehicle 102 initiated by the user. The user image sensor(s) 166 may be embodied as any type of image sensor, such as a camera, capable of capturing an image of the user or the user's environment (e.g., an environment of the vehicle 102). In the illustrative embodiment, the user image sensor 166 is configured to monitor location, position, orientation, movement, gesture and/or expression of the user and other occupant(s) of the vehicle 102 to determine user context and activity. For example, the user image sensor 166 may monitor a position of user and/or occupant to detect turning of the user's head to the left, which may be an indicative of an upcoming left turn of the vehicle 102. Of course, it should be appreciated the vehicle sensors 160 may include additional or other sensors to generate sensor data indicative of a user activity in other embodiments.

The vehicle navigation subsystem 170 is configured to provide navigation data based on a geographic location of the vehicle 102. The navigation data allows the user notification controller 120 to associate user activities with geographical locations, travel paths and/or traffic patterns associated with the predicted travel paths. The vehicle navigation subsystem 170 may be embodied as any type of navigation system capable of producing navigational data related to the movement of the vehicle 102 (e.g., map-based data). For example, the vehicle navigation subsystem 170 may employ a Global Positioning System (GPS) and/or GLONASS (Global Orbiting Navigation System) receiver to track the location of the vehicle 102. As discussed above, the navigation data of the vehicle 102 may be shared among other vehicles 102 by crowd-sourcing. Additionally, in some embodiments, the user notification controller 120 may form a portion of the vehicle navigation subsystem 170 in some embodiments.

As discussed above, in some embodiments, the system 100 may include one or more user-worn sensors 180. The user-worn sensors 180, like the activity sensors 132 and the vehicle sensors 160, are configured to generate sensor data that may be used to determine the activity of the user of the vehicle 102. In such embodiments, the user notification controller 120 may or may not include the activity sensor(s) 132. Regardless, illustratively, the user-worn sensors 180 may include a motion sensor 182, an image sensor 184, and/or an audio sensor 186 to generate the user activity data. For example, the user-worn motion sensor 182 (e.g., a gyroscope or accelerometer) may generate or produced sensor data indicative of a motion of the user of the vehicle 102; the user-worn image sensor 184 (e.g., a camera) may generate or produced sensor data indicative of relative positions of the body parts of the user of the vehicle 102; and/or the user-worn audio sensor 186 (e.g., microphone) may generate or produced sensor data indicative of a voice of the user of the vehicle 102. Again, it should be appreciated that the sensor data may be stored and analyzed to determine the user activity to determine whether to provide a user notification to the user as discussed in detail below. In some embodiments, the user-worn sensors 114 may also be worn by other occupants of the vehicle 102 to detect the overall environmental changes of the vehicle 102.

It should be appreciated that, in some embodiments, the activity sensor(s) 132 and the user-worn sensor(s) 180 may be incorporated in different devices. For example, in some embodiments, the user-worn sensors 180 may be incorporated in a smart watch, a wearable device, accessories, and/or clothing of the user and the activity sensor(s) 132 may be incorporated in a dashboard of the vehicle 102. In other embodiments, the activity sensor(s) 132 and the user-worn sensor(s) 180 may be incorporated in, or form a portion of, a same device.

As discussed above, the user notification controller 120 may be embodied as a stand-alone notification system or may be incorporated into the vehicle 102. In those embodiments in which the user notification controller 120 is incorporated into the vehicle 102, the vehicle 102 may include one or more vehicle output devices 190 configured to provide a user notification. The vehicle output devices 190 may include any type of devices and components for providing user notifications to the user of the vehicle 102. For example, in the illustrative embodiment, the vehicle output device 190 includes an audio output device 192. The audio output device 192 may be embodied as any type of device (e.g., a speaker) capable of rendering a user notification that includes a sound. Additionally, in some embodiments, the vehicle output devices 190 may further include a display 194 and a haptic output device 196. The display 194 may be embodied as any type of display on which the user notifications can be provided. In some embodiments, the display 194 is incorporated in the vehicle 102. For example, in some embodiments, the display 194 may be embodied as a navigation display screen of the vehicle 102. Similarly, the haptic output device 196 may be embodied as any type of output device capable of rendering user notifications that includes haptic or tactile feedback. For example, the haptic output device 196 may be embodied as a rumble device.

The local network 150 may be embodied as any type of network capable of facilitating communications between the components of the vehicle 102, such as the user notification controller 120, the vehicle sensors 160, the vehicle navigation subsystem 170, the user-worn sensors 180, and the vehicle output devices 190. For example, the local network 150 may be embodied as, or otherwise include, a controller area network (CAN), a personal area network (PAN), a wireless local area network (LAN), and/or other type of network.

In some embodiments, the system 100 may include multiple vehicles 102 communicating with each other over a network 106. Each vehicle 102 may share crowd-sourced user activity data experienced by the corresponding vehicle 102 with other vehicles 102 for updating rules for determining user activity as discussed below. For example, if a user of a vehicle 102 activates a right turn signal on a highway and reduces speed 300 feet prior to exiting the highway, the vehicle 102 may generate crowd-sourced user activity data associated with the geographical location of the exit and the user activity sensed by the vehicle 102 (i.e., activation of the right turn signal and pressure on the brake pedal). The vehicle 102 may subsequently transmit the generated crowd-sourced user activity data to other vehicles over the network 106 such that other vehicles may use the received crowd-sourced user activity data to determine user activity when exiting that particular exit.

In some embodiments, the system 100 may one or more compute device 104, which may communicate with the vehicle 102 over the network 106. In the illustrative embodiment, the compute devices 104 are owned by the user of the vehicle 102. For example, the compute devices 104 may be embodied as a smartphone, a smart watch, smart apparel, a laptop computer, a tablet computer, or other compute device wearable or capable of being carried by a corresponding user. Each of the compute devices 104 may include a corresponding user notification controller 120 configured to determine whether to present a user notification to the user. As discussed in detail below, the compute device 104 may receive a notice from the user notification controller 120 of the vehicle 102 indicative of a presentation or suppression of a user notification to the user at the vehicle 102 and suppress a local notification that is related to the received notification suppression to avoid presenting a redundant notification.

The network 106 may be embodied as any type of network capable of facilitating communications between the vehicle 102 and one or more compute devices 104 and/or between multiple vehicles 102. For example, the network 106 may be embodied as, or otherwise include, a wireless local area network (LAN), a wireless wide area network (WAN), a cellular network, and/or a publicly-accessible, global network such as the Internet. As such, the network 106 may include any number of additional devices, such as additional computers, routers, and switches, to facilitate communications thereacross.

Figure 2:
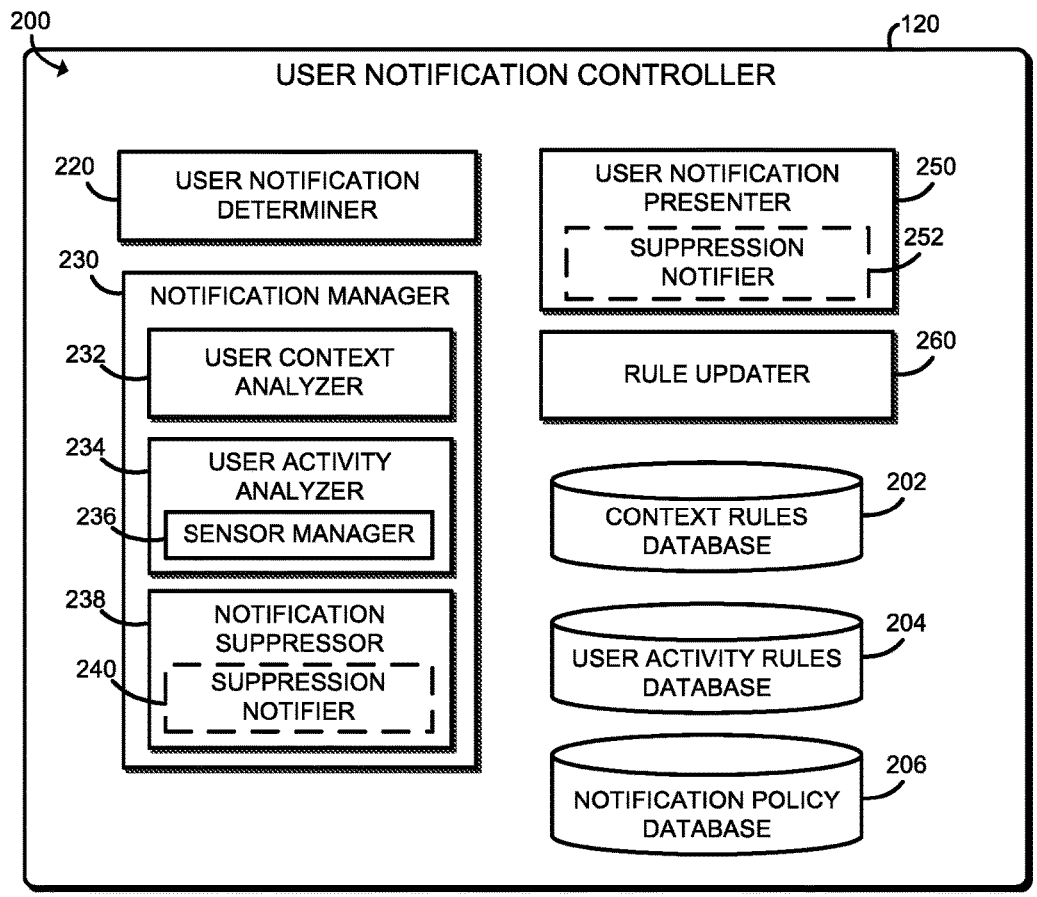
FIG. 2 is a simplified block diagram of at least one embodiment of an environment that may be established by a user notification controller of the system of FIG. 1.

Referring now to FIG. 2, the user notification controller 120 may establish an environment 200 during operation. The illustrative environment 200 includes a user notification determiner 220, a notification manager 230, a user notification presenter 250, and a rule updater 260. In the illustrative embodiment, the notification manager 230 further includes a user context analyzer 232, a user activity analyzer 234, and a notification suppressor 238. The various components of the environment 200 may be embodied as hardware, firmware, software, or a combination thereof. As such, in some embodiments, one or more of the components of the environment 200 may be embodied as circuitry or collection of electrical devices (e.g., a user notification determiner circuit 220, a notification manager circuit 230, a user notification presenter circuit 240, a rule updater circuit 250, a user context analyzer circuit 232, a user activity analyzer circuit 234, and a notification suppressor circuit 238, etc.). It should be appreciated that, in such embodiments, one or more of the user notification determiner circuit 220, the notification manager circuit 230, the user notification presenter circuit 240, the rule updater circuit 250, the user context analyzer circuit 232, the user activity analyzer circuit 234, the notification suppressor circuit 238, and/or other components of the user notification controller 120. Additionally, in some embodiments, one or more of the illustrative components of the environment 200 may form a portion of another component and/or one or more of the illustrative components may be independent of one another. Further, in some embodiments, one or more of the components of the environment 200 may be embodied as virtualized hardware components or emulated architecture, which may be established and maintained by the processor 122 or other components of the user notification controller 120.

The user notification determiner 220 is configured to determine a presence of a user notification that is to be presented to the user of the vehicle 102. For example, the user notification determiner 220 may determine a presence of a user notification by locally generating a user notification based on various sensor data. Additionally or alternatively, the user notification determiner 220 may determine a presence of a user notification that is received from a source remote to the user notification controller 120 for presentation to the user. The source remote to the user notification controller 120 may be embodied as the local components of the vehicle 102, such as the vehicle sensors 160, the vehicle navigation subsystem 170, or the user-worn sensors 180. In other embodiments, the remote source may be one of the compute devices 104.

The notification manager 230 is configured to determine whether to present a user notification to the user of the vehicle 102. As discussed above, the notification manager 230 includes the user context analyzer 232, the user activity analyzer 234, and the notification suppressor 238. The user context analyzer 232 is configured to determine a context of the user and determine whether to enable a suppression of the user notification based the determined context of the user. To do so, the user context analyzer 232 receives sensor data indicative of a present activity of the user and determines a context of the user based on the sensor data. The sensor data may be received from any of the activity sensors 132, the vehicle sensors 160, and/or the user-worn sensors 180. The user context analyzer 232 compares the determined context of the user to a set of context rules stored in a context rules database 202 to determine whether a presentation of a user notification would interrupt the user's present activity. The illustrative context rules define various contexts of the user (e.g., user actions or states) during which notification supersession is not needed. As such, if the user context analyzer 232 determines that a presentation of a user notification would not interrupt the user's present activity based on the user context, the user context analyzer 232 may not enable the notification suppression. In such case, the user notification may not be suppressed even if the user has knowledge of information included in the user notification. For example, if the user of the vehicle 102 is not listening to the audio, the user context analyzer 232 may not suppress the presentation of the navigation instruction even if the user already has knowledge of, or is otherwise already complying, with the navigation instruction.

The user activity analyzer 234 is configured to determine an activity of the user of the vehicle 102. Specifically, the user activity analyzer 234 is configured to determine whether the determined activity of the user is indicative of the user's knowledge of information included in the user notification prior to the presentation of the user notification to the user. For example, in embodiments in which the user notification is embodied as a user instruction, the user activity analyzer 234 determines the user's compliance to the user instruction (e.g., a navigation instruction) prior to the presentation of the user instruction to the user based on the user activity. To do so, the user activity analyzer 234 includes a sensor manager 236. The sensor manager 236 is configured to receive sensor data from one or more activity sensors 132 and determine a present activity of the user based on the activity sensor data. It should be appreciated that the received sensor data may be motion data, interaction data, image data, and/or audio data indicative of the user's present activity. Additionally, the determined activity of the user may be embodied as any user activity that is indicative of the user's knowledge of a proposed user notification (e.g., the user's body language, the user's activation of vehicle controls, the user's spoken words, etc.).

The notification suppressor 238 is configured to suppress a presentation of a proposed user notification to the user in response to a determination that the determined activity of the user is indicative of the user's prior knowledge of the information included in the user notification. To determine whether the determined activity of the user is indicative of the user's knowledge of information included in the user notification, the notification suppressor 238 is configured to compare the determined activity of the user to a set of user activity rules stored in a user activity rules database 204, which define a mapping between user's activities and types of associated notifications (i.e., which user activities are indicative of knowledge of which type of notifications). For example, if the proposed user notification is embodied as a navigation instruction to turn left at the next intersection, the user activity rules may define user activities such as the user activing a left turn signal, reducing the speed of the vehicle 102, and/or turning her/his head to check the left side mirror of the vehicle 120 as associated with the proposed navigation instructions.

If the notification suppressor 238 identifies one or more user activities are associated with the proposed user notification, the notification suppressor 238 further determines whether the user activities, in total, provide a reliable indication of the user's knowledge of the proposed user notification. To do so, in the illustrative embodiment, the notification suppressor 238 determines a confidence score of the user's knowledge by comparing the determined activities of the user to a notification policy 206, which includes a mapping of user activities to confidence scores. It should be appreciated that the notification suppressor 238 may determine the confidence score based on multiple activities of the user. If the confidence score satisfies a reference threshold, the notification suppressor 238 determines that the user has knowledge of the information included in the user notification and suppresses the presentation of the user notification. For example, if the user activity includes activating the right turn signal when the navigation instruction is to turn left, the confidence score would not satisfy a reference threshold. Additionally, even if the user does have his/her right turn signal activated, that activity alone may not have a high enough confidence score to suppress the user instruction to turn right (e.g., the user may have been driving for a while with the right turn signal engaged and has not yet changed to the turn lane).

To suppress the presentation of the user notification, the notification suppressor 238 may ignore, delete, and/or not present the user notification to the user. Additionally, in some embodiments, the notification suppressor 238 may utilize a machine-learning algorithm to learn or improve the identification of which user activities are indicative of what user knowledge over time. For example, if notification suppressor 238 determines over time that the user habitually utilizes her/his left turn signal but not her/his right turn signal, the notification suppressor 238 may apply a higher confidence score to the activation of the left turn signal compared to the activation of the right turn signal. In such embodiments, the mere activation of the user's left turn signal may be enough (i.e. a high confidence score) to suppress a navigation instruction to turn left, but the activation of the user's right turn signal may not be enough (i.e., too low of a confidence score) by itself to suppress a navigation instruction to turn right.

In some embodiments, the notification suppressor 238 may further include a suppression notifier 240. The suppression notifier 240 is configured to transmit a suppression notification to one or more remote compute devices 104 in response to a suppression of the user notification by the notification suppressor 238. The suppression notification instructs the remote compute device 104 to suppress the presentation of a local notification by the remote compute device that corresponds to the user notification. For example, if the user notification controller 120 determines that the user is already aware of an adverse weather condition and suppresses a user notification alerting the user to that adverse weather condition, the user notification controller 120 may transmit a suppression notification to the user's smartphone to stop the smartphone from providing a similar user notification about the adverse weather condition.

The user notification presenter 250 is configured to present the user notification to the user of the vehicle 102. In some embodiments, the user notification presenter 250 may present the user notification if the user context analyzer 232 determines not to enable suppression of the user notification. For example, if the user is not listening to the audio of the vehicle 102 and not engaged in a conversation, the user notification controller 120 may determine to present the user notification even if the user may already have knowledge of the user notification. Additionally, the user notification presenter 250 may present the user notification in response to a determination that the determined activity of the user is not indicative of the user's knowledge of the information included in the user notification.

In some embodiments, the user notification presenter 250 may further include a suppression notifier 252. The suppression notifier 252 is configured to transmit a suppression notification to a remote compute device 104 in response to the presenting of the user notification to the user. Similar to the suppression notifier 240, the suppression notification instructs the remote compute device 104 to suppress the presentation of a local notification by the remote compute device 104 that corresponds to the user notification. That is, the suppression notifier 252 is configured to prevent a presentation of a redundant notification to the user by the remote compute device 104. For example, if the user notification controller 102 presents a user notification to the user about an adverse weather condition, the user notification controller 102 may transmit a suppression notification to the user's smartphone to stop the smartphone from providing a similar user notification about the adverse weather condition.

The rule updater 260 is configured to update local rules that are used to determine whether to suppress a user notification to the user of the vehicle 102. To do so, as discussed above, the rule updater 260 may utilize a machine-learning algorithm to adapt or update the any one of the context rules of the context rules database, the user activity rules of the user activity rules database 204, and/or the notification policy rules of the notification policy database 206 based on the user's activities or response. Additionally, in some embodiments, the rule updater 260 may update any of the rules based on crowed-sourced data obtained from other user notification controllers 120 and/or from other remote sources. For example, in some embodiments, crowd-sourced user notification controllers 120 may share user context information, user activity information, and/or policy rules. In such embodiments, the user notification controllers 120 may utilize machine-learning to adapt or improve the stored rules to better identify which user activities are indicative of user knowledge of particular user notification under certain circumstance. For example, as discussed above, a particular users' activity (e.g., speeding up slighting before a turn) at a particular location may become indicative of user's knowledge based on the activity of the crowd of users, even though that activity did not initially appear to be so for any one particular user.

Figure 3:
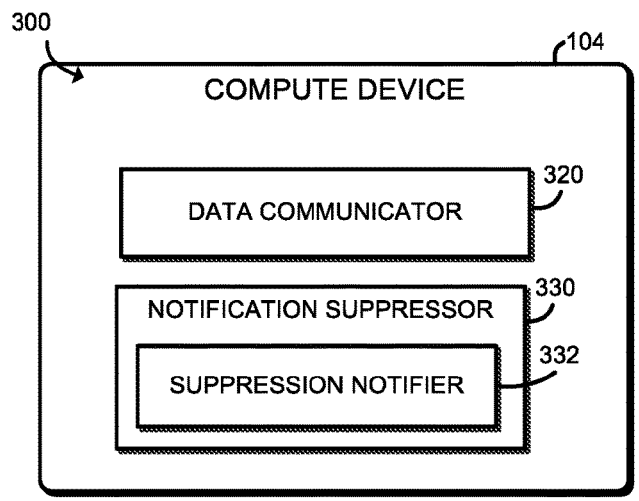
FIG. 3 is a simplified block diagram of at least one embodiment of an environment that may be established by a compute device of the system of FIG. 1.

Referring now to FIG. 3, each compute device 104 may establish an environment 300 during operation. The illustrative environment 300 includes a data communicator 320 and a notification suppressor 330. The notification suppressor 330 further includes a suppression notifier 332. The various components of the environment 300 may be embodied as hardware, firmware, software, or a combination thereof. As such, in some embodiments, one or more of the components of the environment 300 may be embodied as circuitry or collection of electrical devices (e.g., a data communicator circuit 320, a notification suppressor circuit 330, and a suppression notifier circuit 332, etc.). It should be appreciated that, in such embodiments, one or more of the data communicator circuit 320, the notification suppressor circuit 330, the suppression notifier circuit 332, and/or other components of the compute device 104. Additionally, in some embodiments, one or more of the illustrative components of the environment 300 may form a portion of another component and/or one or more of the illustrative components may be independent of one another. Further, in some embodiments, one or more of the components of the environment 300 may be embodied as virtualized hardware components or emulated architecture, which may be established and maintained by a processor or other components of the user notification controller 120.

The data communicator 320 is configured to communicate with the user notification controller 120 to receive a suppression notification indicative of a presentation or suppression of a user notification to the user at the vehicle 102. In response to receiving the suppression notification, the notification suppressor 330 is configured to suppress a local notification that is related to the received notification suppression to avoid presenting a redundant notification as discussed above. Additionally, the suppression notifier 332 may transmit suppression notifications to the user notification controller 120 or other components of the system 100 in response to compute device 104 presenting a user notification to the user.

Figure 4:
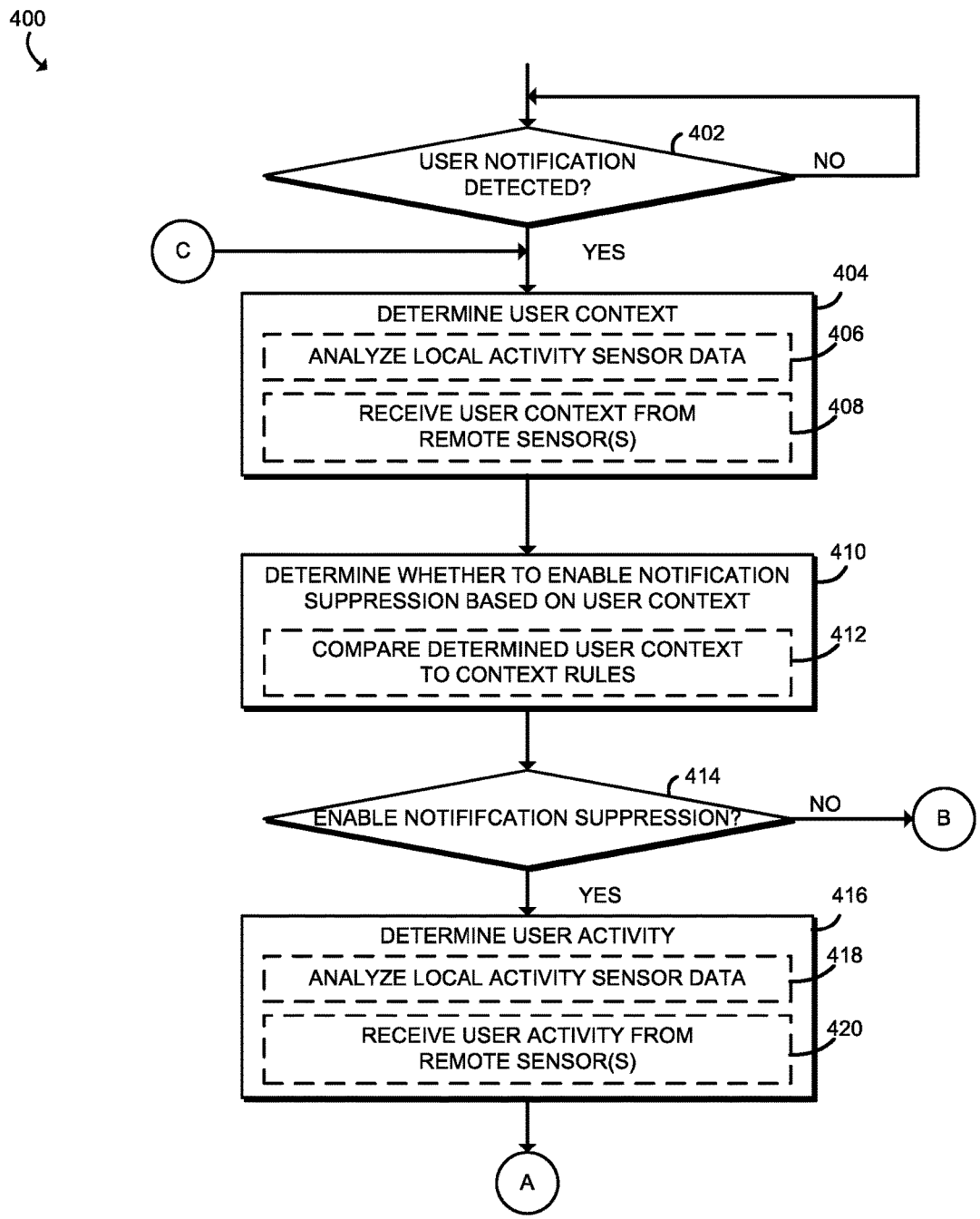
FIGS. 4-5 are a simplified flow diagram of at least one embodiment of a method for suppressing a presentation of a user notification to a user that may be executed by the user notification controller of FIGS. 1 and 2.
Figure 5:
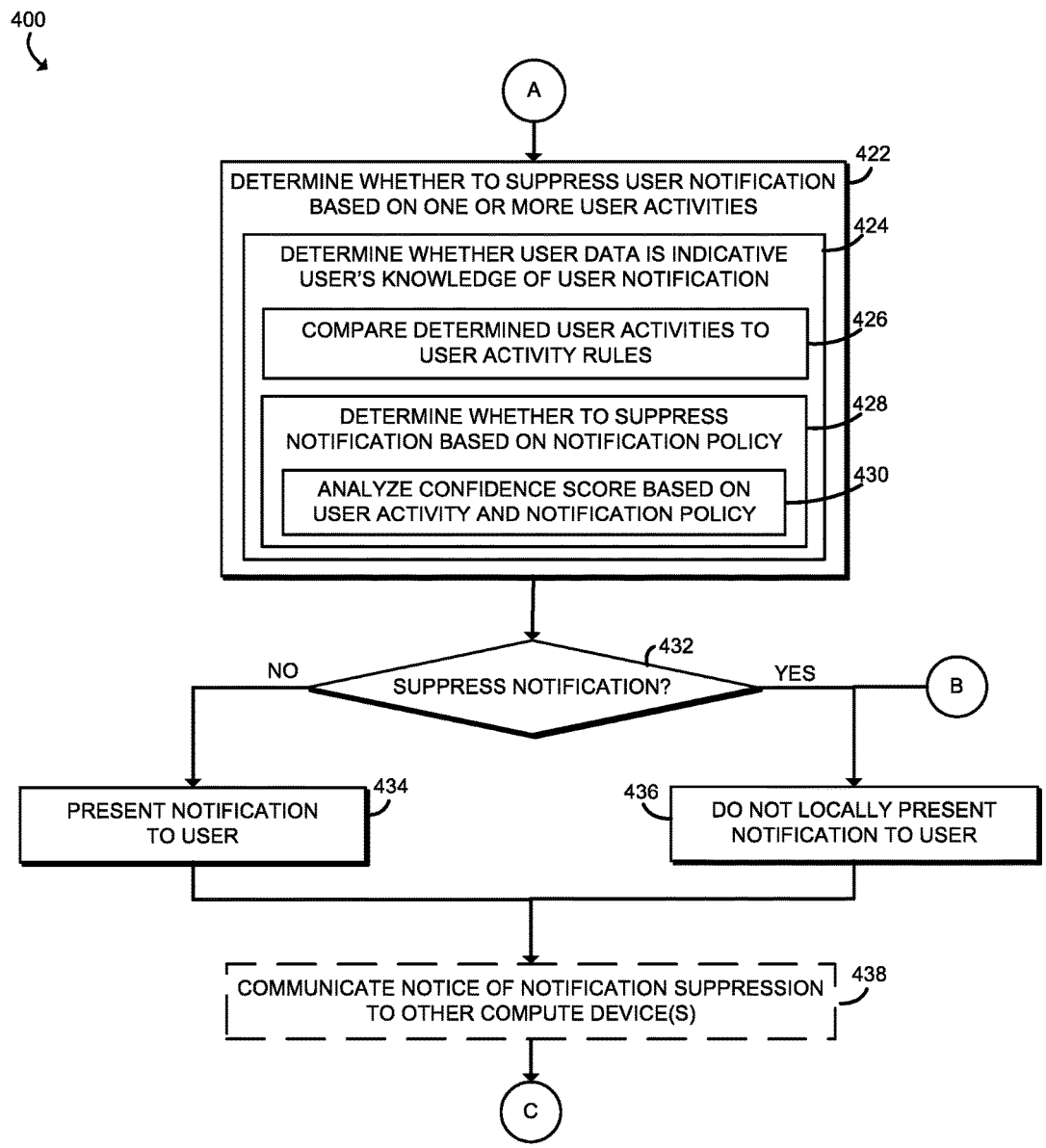

Referring now to FIGS. 4 and 5, in use, the user notification controller 120 may execute a method 400 for determining whether to present a user notification to the user of the vehicle 102. The method 400 begins with block 402 in which the user notification controller 120 determines whether a user notification has been detected. For example, in some embodiments, the user notification controller 120 may generate a user notification based on the sensor data produced by one or more of activity sensors 132 local to the user notification controller 120. In other embodiments, the user notification controller 120 may generate a user notification based on the sensor data received from a source remote (e.g., the vehicle sensors 160 or user-worn sensors 108) to the user notification controller 120. Additionally or alternatively, the user notification controller 120 may receive a user notification from a source remote to the user notification controller 120. It should be appreciated that the source remote to the user notification controller 120 may be the local components of the vehicle 102, such as the vehicle sensors 160, the vehicle navigation subsystem 170, or the user-worn sensors 180, or the compute devices 104 such as the user's smartphone.

If the user notification controller 120 determines that a user notification has not been detected, the method 400 loops back to block 402 to continue detecting for a user notification. If, however, the user notification controller 120 determines that the user notification has been detected, the method 400 advances to block 404. In block 404, the user notification controller 120 determines a user context of the user. To do so, in some embodiments, the user notification controller 120 may analyze local activity sensor data produced from the activity sensors 132 to determine a user context as indicated in block 406. Additionally or alternatively, the user notification controller 120 may determine the user's context based on sensor data received from remote sensor(s) as indicated in block 408. The remote sensors may include, for example, the vehicle sensors 160, the user-worn sensors 180, or the compute devices 104. As discussed above, the user context is indicative of the present context, action, or state of the user or the user's environment and is used to determine whether to enable suppression of the user notification as discussed below. The user context may include user's present activities and/or any activities captured in the user's environment (e.g., an environment of the vehicle 102) that indicates whether presenting a user notification to the user would disturb the user's present activity. For example, the user notification controller 120 may determine whether the user is listening to the audio of the vehicle 102, such as a radio, music, or audiobook, or talking to someone in the vehicle 102 or over the phone.

In block 410, the user notification controller 120 determines whether to enable a notification suppression based on the determined user context. To do so, in some embodiments in block 412, the user notification controller 120 compares the determined user context to the context rules stored in the context rules database 202. As discussed above, the context rules define various user contexts during which the notification suppression features may be disabled. For example, if the user is not engaged in a conversation, is not listening to the audio of the vehicle 102, and/or is otherwise not engaged in some intensive activity, the notification suppression may be disabled because the presentation of the user notification would not overly interrupt the user even if the user already has knowledge of the information included in the user notification.

If, in block 414, the user notification controller 120 determines not to enable the notification suppression, the method 400 skips ahead to block 436 of FIG. 5. If, however, the user notification controller 120 determines to enable the notification suppression based on the context of the user, the method 400 advances to block 416. In block 416, the user notification controller 120 determines the activity of the user. To do so, in some embodiments, the user notification controller 120 may analyze the local activity sensor data produced by the activity sensors 132 to determine a user activity as indicated in block 418. Additionally or alternatively, the user notification controller 120 may receive a user activity from remote sensor(s) as indicated in block 420. As discussed above, the remote sensors may include the vehicle sensors 160, the user-worn sensors 180, or the compute devices 104.

In block 422 of FIG. 5, the user notification controller 120 determines whether to suppress the user notification based on one or more of the determined user activities. To do so, the user notification controller 120 determines whether one or more user activities are indicative of user's knowledge of the user notification as indicated in block 424. For example, in block 426, the user notification controller 120 compares the determined user activities to the user activity rules 204 to determine those activities associated with the proposed user notification as discussed above. The identified associated activities are compared to the notification policy rules 206 in block 428 to determine whether to suppress the user notification. To do so, in block 430, the user notification controller 120 determines a confidence score based on the associated user activity and the notification policy 206 to determine a final or overall confidence level of the user's knowledge of information included in the user notification.

If, in block 432, the user notification controller 120 determines not to suppress the user notification, the method 400 advances to block 434 in which the user notification controller 120 presents the user notification to the user. If, however, the user notification controller 120 determines to suppress the user notification, the method 400 advances to block 436, in which the user notification controller 120 does not locally present the user notification to the user of the vehicle 102. In some embodiments, in block 438, the user notification controller 120 may communicate a suppression notification to other compute device(s) 104 to suppress the presentation of user notifications on the other compute devices 104 similar to the present user notification. It should be appreciated that the user notification controller 120 may transmit the suppression notification to the other compute devices 104 if the user notification controller 120 determines to suppress the user notification or if the user notification controller 120 determines to present the user notification as discuss above.

In an example of the execution of the method 400 by the illustrative user notification controller 120, the user notification is embodied as a navigation instruction (e.g., "turn left at the next interaction") and the user notification controller 120 is embodied as or included in the vehicle navigation sub-system 170. In such an example, the user notification controller 120 initially determines the present activities of the user to infer whether the user is already aware of the upcoming navigation instruction to turn left. To do so, for example, the user notification controller 120 may determine that the user present activities include activating a left turn signal, maintaining the speed of the vehicle 102, switching lanes to the turn lane, and turning the user's head to check the left side mirror. The user notification controller 120 may then determine which of the determined activities is associated with the "turn left" user instructions (e.g., each of the listed examples, except for maintaining the speed of the vehicle 102). The user notification controller 120 may then determine an overall confidence score based on the identified associated user activities. if the determined overall confidence score matches a reference threshold of the particular navigation instruction, the user notification controller 102 determines that the user is already in compliance with the navigation instruction prior to presenting the navigation instruction to the user and, therefore, does not present that navigation instruction to the user.

Figure 6:
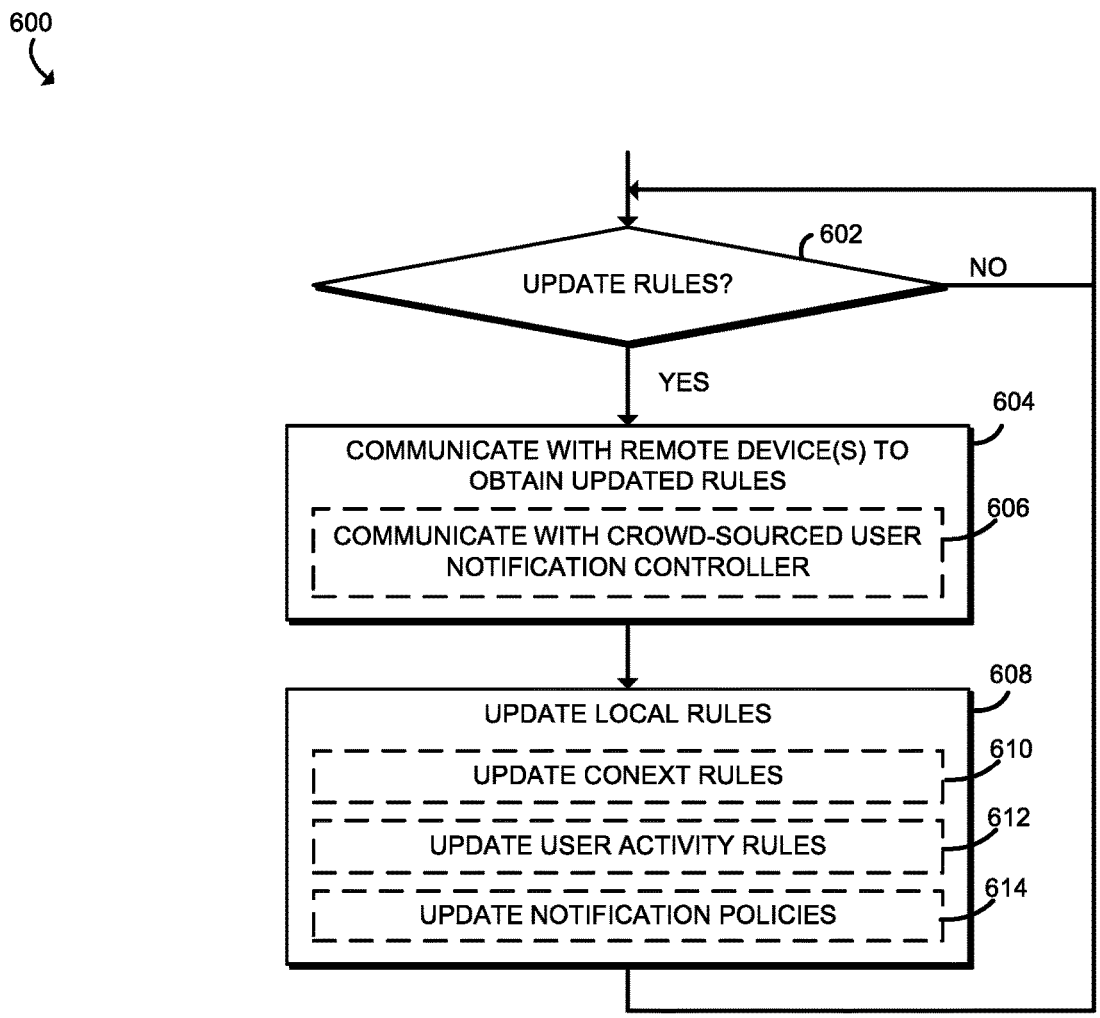
FIG. 6 is a simplified flow diagram of at least one embodiment of a method for updating rules for determining a user notification suppression that may be executed by the user notification controller of FIGS. 1 and 2.

Referring now to FIG. 6, in use, the user notification controller 120 may execute a method 600 for updating rules that are used to determine whether to suppress a user notification to the user of the vehicle 102. The method 600 begins with block 602 in which the user notification controller 120 determines whether to update the rules. If the user notification controller 120 determines not to update the rules, the method 600 loops back to block 602 to continue determining whether to update the rules. If, however, the user notification controller 120 determines to update the rules, the method 600 advances to block 604.

In block 604, the user notification controller 120 communicates with one or more remote devices to obtain updated rules. The remote devices may be embodied as the remote compute devices 104 or other user notification controller 120 of other vehicles 102. For example, in some embodiments, the user notification controller 120 may communicate with one or more crowd-sourced user notification controllers of the remote devices to obtain the updated rules as indicated in block 606. As discussed above, by crowd-sourcing the rules used by the user notification controller 120, the rules may be updated or improved based on the activities of a crowd of users of user notification controllers 120.

In block 608, the user notification controller 120 updates local rules based on the obtained updated rules. In the illustrative embodiment, the local rules may include the context rules, the user activity rules, and/or the notification policies. Accordingly, the user notification controller 120 may update the context rules as indicated in block 610, the user activity rules as indicated in block 612, and/or the notification policies as indicated in block 614. Subsequent to updating the local rules, the method 600 loops back to block 602 to continue determining whether to update the rules.

Figure 7:
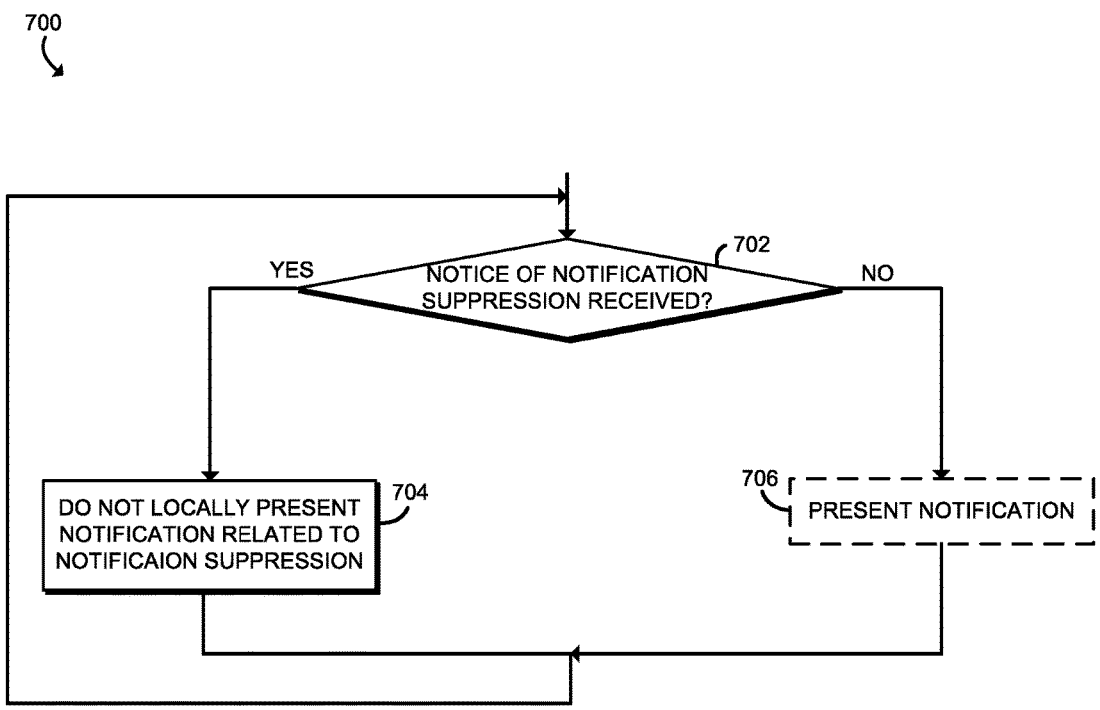
FIG. 7 is a simplified flow diagram of at least one embodiment of a method for suppressing a presentation of a user notification to a user that may be executed by the compute device of FIGS. 1 and 3 in response to receiving a notice of notification suppression from the user notification controller of FIGS. 1 and 2.

Referring now to FIG. 7, in use, each compute device 104 may execute a method 700 for determining whether to present a user notification in response to receiving a notice of a notification suppression from the user notification controller 120. The method 700 begins with block 702 in which the compute device 104 determines whether a notice of the notification suppression is received. If the compute device 104 determines that the notice was received, the method 700 advances to block 704. In block 704, the compute device 104 suppresses a notification that is related or similar to the notification suppression such that the notification is not locally presented to the user. The method 700 then loops back to block 702 to continue monitoring for a receipt of a notice of notification suppression.

If, however, the compute device 104 determines that the notice was not received, the method 700 advances to block 706 in which the compute device 104 presents the notification to the user and loops back to block 702 to continue monitoring for a receipt of a notice of notification suppression.

EXAMPLES

Illustrative examples of the technologies disclosed herein are provided below. An embodiment of the technologies may include any one or more, and any combination of, the examples described below.

Example 1 includes a user notification controller to control a presentation of notifications to a user, the user notification controller comprising a user notification determiner to determine whether a user notification is to be presented to the user; and a user activity analyzer to determine an activity of the user; and a notification suppressor to (i) determine whether the determined activity of the user is indicative of the user's knowledge of information included in the user notification prior to the presentation of the user notification to the user and (ii) suppress the presentation of the user notification to the user in response to a determination that the determined activity of the user is indicative of the user's knowledge of the information included in the user notification.

Example 2 includes the subject matter of Example 1, and wherein the user notification is a user instruction, and wherein to determine whether the determined activity of the user is indicative of the user's knowledge of information included in the user notification comprises to determine whether the determined activity of the user is indicative of the user's compliance to the user instruction prior to the presentation of the user instruction to the user.

Example 3 includes the subject matter of any of Examples 1 and 2, and wherein to determine whether the determined activity of the user is indicative of the user's knowledge of information included in the user notification comprises to determine whether the determined activity of the user is indicative of the user's knowledge of information included in the user notification based on activity rules that have been crowd-sourced from other user notification controllers, wherein each activity rule associates one or more user activities to a corresponding notification.

Example 4 includes the subject matter of any of Examples 1-3, and wherein to determine whether the determined activity of the user is indicative of the user's knowledge of information included in the user notification comprises to compare the determined activity of the user to user activity rules to determine whether the determined activity of the user is associated with the user notification.

Example 5 includes the subject matter of any of Examples 1-4, and further including a rule updater to update the user activity rules based on historical activity of the user using a machine-learning algorithm.

Example 6 includes the subject matter of any of Examples 1-5, and wherein to determine whether the determined activity of the user is indicative of the user's knowledge of information included in the user notification comprises to determine a confidence score of the user's knowledge in response to a determination that the determined activity of the user is associated with the user notification.

Example 7 includes the subject matter of any of Examples 1-6, and wherein to determine the confidence score comprises to compare the determined activity of the user to a notification policy database, wherein the notification policy database maps user activities to confidence scores.

Example 8 includes the subject matter of any of Examples 1-7, and wherein to determine the confidence score comprises to determine the confidence score based on multiple activities of the user.

Example 9 includes the subject matter of any of Examples 1-8, and wherein to determine whether the determined activity of the user is indicative of the user's knowledge of information included in the user notification comprises to compare the confidence score to a reference threshold, and wherein to suppress the presentation of the user notification comprises to suppress the presentation of the user notification in response to a determination that the confidence score satisfies a predetermined relationship with the reference threshold.

Example 10 includes the subject matter of any of Examples 1-9, and wherein to determine whether the user notification is to be presented comprises to generate the user notification.

Example 11 includes the subject matter of any of Examples 1-10, and wherein to determine whether the user notification is to be presented comprises to receive the user notification from a source remote to the controller.

Example 12 includes the subject matter of any of Examples 1-11, and wherein to determine the activity of the user comprises to receive activity sensor data from one or more activity sensors; and determine a present activity of the user based on the activity sensor data.

Example 13 includes the subject matter of any of Examples 1-12, and wherein to receive activity sensor data comprises to receive user motion data from a motion sensor; and determine the present activity comprises to determine a present activity of the user based on the user motion data.

Example 14 includes the subject matter of any of Examples 1-13, and wherein to determine the activity of the user comprises to receive interaction data from one or more interaction sensors, wherein the interaction data is indicative of a user interaction; and determine an activity of the user based on the interaction data.

Example 15 includes the subject matter of any of Examples 1-14, and wherein to suppress the presentation of the user notification comprises to ignore, delete, or not present the user notification to the user.

Example 16 includes the subject matter of any of Examples 1-15, and wherein the notification suppressor is further to transmit a suppression notification to a remote compute device in response to a determination that the determined activity of the user is indicative of the user's knowledge of the information included in the user notification, wherein the suppression notification instructs the remote compute device to suppress the presentation of a local notification by the remote compute device that corresponds to the user notification.

Example 17 includes the subject matter of any of Examples 1-16, and further including a user context analyzer to (i) determine a context of the user and (ii) determine whether to enable suppression of the user notification based the determined context of the user.

Example 18 includes the subject matter of any of Examples 1-17, and wherein to determine the context of the user comprises to receive sensor data indicative of a present activity of the user; and determine the context of the user based on the sensor data.

Example 19 includes the subject matter of any of Examples 1-18, and wherein to determine whether to enable suppression of the user notification comprises to compare the determined context of the user to a context rule.

Example 20 includes the subject matter of any of Examples 1-19, and wherein to suppress the presentation of the user notification to the user comprises to suppress the user notification to the user in response to a determination to enable suppression of the user notification.

Example 21 includes the subject matter of any of Examples 1-20, and further including a user notification presenter to present the user notification to the user in response to a determination to not enable suppression of the user notification.

Example 22 includes the subject matter of any of Examples 1-21, and further including a user notification presenter to transmit a suppression notification to a remote compute device in response to a presentation of the user notification to the user, wherein the suppression notification instructs the remote compute device to suppress the presentation of a local notification by the remote compute device that corresponds to the user notification.

Example 23 includes the subject matter of any of Examples 1-22, and further including a user notification presenter to present the user notification to the user in response to a determination that the determined activity of the user is not indicative of the user's knowledge of the information included in the user notification.

Example 24 includes the subject matter of any of Examples 1-23, and wherein the user notification presenter is further to transmit a suppression notification to a remote compute device in response to a presentation of the user notification to the user, wherein the suppression notification instructs the remote compute device to suppress the presentation of a local notification by the remote compute device that corresponds to the user notification.

Example 25 includes the subject matter of any of Examples 1-24, and wherein the user notification is a navigation instruction and the user notification controller is a vehicle navigation system to control a presentation of the navigation instruction to the user.

Example 26 includes a method for providing a notification to a user of a controller, the method comprising determining, by the controller, whether a user notification is to be presented to the user; determining, by the controller, an activity of the user; determining, by the controller, whether the determined activity of the user is indicative of the user's knowledge of information included in the user notification prior to the presentation of the user notification to the user; and suppressing, by the controller, the presentation of the user notification to the user in response to a determination that the determined activity of the user is indicative of the user's knowledge of the information included in the user notification.

Example 27 includes the subject matter of Example 26, and wherein the user notification is a user instruction, and wherein determining whether the determined activity of the user is indicative of the user's knowledge of information included in the user notification comprises determining whether the determined activity of the user is indicative of the user's compliance to the user instruction prior to the presentation of the user instruction to the user.

Example 28 includes the subject matter of any of Examples 26 and 27, and wherein determining whether the determined activity of the user is indicative of the user's knowledge of information included in the user notification comprises determining whether the determined activity of the user is indicative of the user's knowledge of information included in the user notification based on activity rules that have been crowd-sourced from other user notification controllers, wherein each activity rule associates one or more user activities to a corresponding notification.

Example 29 includes the subject matter of any of Examples 26-28, and wherein determining whether the determined activity of the user is indicative of the user's knowledge of information included in the user notification comprises comparing the determined activity of the user to user activity rules to determine whether the determined activity of the user is associated with the user notification.

Example 30 includes the subject matter of any of Examples 26-29, and further including updating the user activity rules based on historical activity of the user using a machine-learning algorithm.

Example 31 includes the subject matter of any of Examples 26-30, and wherein determining whether the determined activity of the user is indicative of the user's knowledge of information included in the user notification comprises determining a confidence score of the user's knowledge in response to a determination that the determined activity of the user is associated with the user notification.

Example 32 includes the subject matter of any of Examples 26-31, and wherein determining the confidence score comprises comparing the determined activity of the user to a notification policy database, wherein the notification policy database maps user activities to confidence scores.

Example 33 includes the subject matter of any of Examples 26-32, and wherein determining the confidence score comprises determining the confidence score based on multiple activities of the user.

Example 34 includes the subject matter of any of Examples 26-33, and wherein determining whether the determined activity of the user is indicative of the user's knowledge of information included in the user notification comprises comparing the confidence score to a reference threshold, and wherein suppressing the presentation of the user notification comprises suppressing the presentation of the user notification in response to a determination that the confidence score satisfies a predetermined relationship with the reference threshold.

Example 35 includes the subject matter of any of Examples 26-34, and wherein determining whether the user notification is to be presented comprises generating, by the controller, the user notification.

Example 36 includes the subject matter of any of Examples 26-35, and wherein determining whether the user notification is to be presented comprises receiving the user notification from a source remote to the controller.

Example 37 includes the subject matter of any of Examples 26-36, and wherein determining the activity of the user comprises receiving, by the controller, activity sensor data from one or more activity sensors; and determining, by the controller, a present activity of the user based on the activity sensor data.

Example 38 includes the subject matter of any of Examples 26-37, and wherein receiving activity sensor data comprises receiving user motion data from a motion sensor; and determining the present activity comprises determining a present activity of the user based on the user motion data.

Example 39 includes the subject matter of any of Examples 26-38, and wherein determining the activity of the user comprises receiving, by the controller, interaction data from one or more interaction sensors, wherein the interaction data is indicative of a user interaction; and determining, by the controller, an activity of the user based on the interaction data.

Example 40 includes the subject matter of any of Examples 26-39, and wherein suppressing the presentation of the user notification comprises ignoring, deleting, or not presenting the user notification to the user.

Example 41 includes the subject matter of any of Examples 26-40, and further including transmitting a suppression notification to a remote compute device in response to a determination that the determined activity of the user is indicative of the user's knowledge of the information included in the user notification, wherein the suppression notification instructs the remote compute device to suppress the presentation of a local notification by the remote compute device that corresponds to the user notification.

Example 42 includes the subject matter of any of Examples 26-41, and further including determining, by the controller, a context of the user; and determining, by the controller, whether to enable suppression of the user notification based the determined context of the user.

Example 43 includes the subject matter of any of Examples 26-42, and wherein determining the context of the user comprises receiving, by the controller, sensor data indicative of a present activity of the user; and determining, by the controller, the context of the user based on the sensor data.

Example 44 includes the subject matter of any of Examples 26-43, and wherein determining whether to enable suppression of the user notification comprises comparing the determined context of the user to a context rule.

Example 45 includes the subject matter of any of Examples 26-44, and wherein suppressing the presentation of the user notification to the user comprises suppressing the user notification to the user in response to a determination to enable suppression of the user notification.

Example 46 includes the subject matter of any of Examples 26-45, and further including presenting the user notification to the user in response to a determination to not enable suppression of the user notification.

Example 47 includes the subject matter of any of Examples 26-46, and further including transmitting a suppression notification to a remote compute device in response to the presenting of the user notification to the user, wherein the suppression notification instructs the remote compute device to suppress the presentation of a local notification by the remote compute device that corresponds to the user notification.

Example 48 includes the subject matter of any of Examples 26-47, and further including presenting the user notification to the user in response to a determination that the determined activity of the user is not indicative of the user's knowledge of the information included in the user notification.

Example 49 includes the subject matter of any of Examples 26-48, and further including transmitting a suppression notification to a remote compute device in response to the presenting of the user notification to the user, wherein the suppression notification instructs the remote compute device to suppress the presentation of a local notification by the remote compute device that corresponds to the user notification.

Example 50 includes one or more computer-readable storage media comprising a plurality of instructions that, when executed by a user notification controller, cause the user notification controller to perform the method of any of Examples 26-49.

Example 51 includes a user notification controller to control a presentation of notifications to a user, the user notification controller comprising means for determining whether a user notification is to be presented to the user; means for determining an activity of the user; means for determining whether the determined activity of the user is indicative of the user's knowledge of information included in the user notification prior to the presentation of the user notification to the user; and means for suppressing the presentation of the user notification to the user in response to a determination that the determined activity of the user is indicative of the user's knowledge of the information included in the user notification.

Example 52 includes the subject matter of Example 51, and wherein the user notification is a user instruction, and wherein the means for determining whether the determined activity of the user is indicative of the user's knowledge of information included in the user notification comprises means for determining whether the determined activity of the user is indicative of the user's compliance to the user instruction prior to the presentation of the user instruction to the user.

Example 53 includes the subject matter of any of Examples 51 and 52, and wherein the means for determining whether the determined activity of the user is indicative of the user's knowledge of information included in the user notification comprises means for determining whether the determined activity of the user is indicative of the user's knowledge of information included in the user notification based on activity rules that have been crowd-sourced from other user notification controllers, wherein each activity rule associates one or more user activities to a corresponding notification.

Example 54 includes the subject matter of any of Examples 51-53, and wherein the means for determining whether the determined activity of the user is indicative of the user's knowledge of information included in the user notification comprises means for comparing the determined activity of the user to user activity rules to determine whether the determined activity of the user is associated with the user notification.

Example 55 includes the subject matter of any of Examples 51-54, and further including means for updating the user activity rules based on historical activity of the user using a machine-learning algorithm.

Example 56 includes the subject matter of any of Examples 51-55, and wherein the means for determining whether the determined activity of the user is indicative of the user's knowledge of information included in the user notification comprises means for determining a confidence score of the user's knowledge in response to a determination that the determined activity of the user is associated with the user notification.

Example 57 includes the subject matter of any of Examples 51-56, and wherein the means for determining the confidence score comprises means for comparing the determined activity of the user to a notification policy database, wherein the notification policy database maps user activities to confidence scores.

Example 58 includes the subject matter of any of Examples 51-57, and wherein the means for determining the confidence score comprises means for determining the confidence score based on multiple activities of the user.

Example 59 includes the subject matter of any of Examples 51-58, and wherein the means for determining whether the determined activity of the user is indicative of the user's knowledge of information included in the user notification comprises means for comparing the confidence score to a reference threshold, and wherein the means for suppressing the presentation of the user notification comprises means for suppressing the presentation of the user notification in response to a determination that the confidence score satisfies a predetermined relationship with the reference threshold.

Example 60 includes the subject matter of any of Examples 51-59, and wherein the means for determining whether the user notification is to be presented comprises means for generating the user notification.

Example 61 includes the subject matter of any of Examples 51-60, and wherein the means for determining whether the user notification is to be presented comprises means for receiving the user notification from a source remote to the controller.

Example 62 includes the subject matter of any of Examples 51-61, and wherein the means for determining the activity of the user comprises means for receiving activity sensor data from one or more activity sensors; and means for determining a present activity of the user based on the activity sensor data.

Example 63 includes the subject matter of any of Examples 51-62, and wherein means for receiving activity sensor data comprises means for receiving user motion data from a motion sensor; and means for determining the present activity comprises means for determining a present activity of the user based on the user motion data.

Example 64 includes the subject matter of any of Examples 51-63, and wherein the means for determining the activity of the user comprises means for receiving interaction data from one or more interaction sensors, wherein the interaction data is indicative of a user interaction; and means for determining an activity of the user based on the interaction data.

Example 65 includes the subject matter of any of Examples 51-64, and wherein the means for suppressing the presentation of the user notification comprises means for ignoring, deleting, or not presenting the user notification to the user.

Example 66 includes the subject matter of any of Examples 51-65, and further including means for transmitting a suppression notification to a remote compute device in response to a determination that the determined activity of the user is indicative of the user's knowledge of the information included in the user notification, wherein the suppression notification instructs the remote compute device to suppress the presentation of a local notification by the remote compute device that corresponds to the user notification.

Example 67 includes the subject matter of any of Examples 51-66, and further including means for determining a context of the user; and means for determining whether to enable suppression of the user notification based on the determined context of the user.

Example 68 includes the subject matter of any of Examples 51-67, and wherein the means for determining the context of the user comprises means for receiving sensor data indicative of a present activity of the user; and means for determining the context of the user based on the sensor data.

Example 69 includes the subject matter of any of Examples 51-68, and wherein the means for determining whether to enable suppression of the user notification comprises means for comparing the determined context of the user to a context rule.

Example 70 includes the subject matter of any of Examples 51-69, and wherein the means for suppressing the presentation of the user notification to the user comprises means for suppressing the user notification to the user in response to a determination to enable suppression of the user notification.

Example 71 includes the subject matter of any of Examples 51-70, and further including means for presenting the user notification to the user in response to a determination to not enable suppression of the user notification.

Example 72 includes the subject matter of any of Examples 51-71, and further including means for transmitting a suppression notification to a remote compute device in response to the presenting of the user notification to the user, wherein the suppression notification instructs the remote compute device to suppress the presentation of a local notification by the remote compute device that corresponds to the user notification.

Example 73 includes the subject matter of any of Examples 51-72, and further including means for presenting the user notification to the user in response to a determination that the determined activity of the user is not indicative of the user's knowledge of the information included in the user notification.

Example 74 includes the subject matter of any of Examples 51-73, and further including means for transmitting a suppression notification to a remote compute device in response to the presenting of the user notification to the user, wherein the suppression notification instructs the remote compute device to suppress the presentation of a local notification by the remote compute device that corresponds to the user notification.

The invention claimed is:

1. A user notification controller to control a presentation of notifications to a user of a vehicle, the user notification controller comprising:
   a user notification determiner to determine whether a user notification is to be presented to the user; and
   a user activity analyzer to (i) determine a present navigation activity of the user to control navigation of the vehicle, (ii) determine whether the navigation activity of the user is indicative of user's compliance to a user instruction included in the user notification prior to the presentation of the user notification to the user, and (iii) determine whether the navigation activity of the user is indicative of the user's knowledge of the user instruction included in the user notification based on the user's compliance; and
   a notification suppressor to suppress the presentation of the user notification to the user in response to a determination that the navigation activity of the user is indicative of the user's knowledge of the user instruction included in the user notification.

2. The user notification controller of claim 1, wherein to determine whether the determined activity of the user is indicative of the user's knowledge of information included in the user notification comprises to determine whether the determined activity of the user is indicative of the user's knowledge of information included in the user notification based on activity rules that have been crowd-sourced from other user notification controllers, wherein each activity rule associates one or more user activities to a corresponding notification.

3. The user notification controller of claim 1, wherein to determine whether the determined activity of the user is indicative of the user's knowledge of information included in the user notification comprises to compare the determined activity of the user to user activity rules to determine whether the determined activity of the user is associated with the user notification.

4. The user notification controller of claim 3, further comprising a rule updater to update the user activity rules based on historical activity of the user using a machine-learning algorithm.

5. The user notification controller of claim 3, wherein to determine whether the determined activity of the user is indicative of the user's knowledge of information included in the user notification comprises to:
   determine a confidence score of the user's knowledge in response to a determination that the determined activity of the user is associated with the user notification, and
   compare the confidence score to a reference threshold, wherein to suppress the presentation of the user notification comprises to suppress the presentation of the user notification in response to a determination that the confidence score satisfies a predetermined relationship with the reference threshold.

6. The user notification controller of claim 5, wherein to determine the confidence score comprises to compare the determined activity of the user to a notification policy database, wherein the notification policy database maps user activities to confidence scores.

7. The user notification controller of claim 1, wherein the notification suppressor is further to transmit a suppression notification to a remote compute device in response to a determination that the determined activity of the user is indicative of the user's knowledge of the information included in the user notification, wherein the suppression notification instructs the remote compute device to suppress the presentation of a local notification by the remote compute device that corresponds to the user notification.

8. The user notification controller of claim 1, further comprising a user context analyzer to (i) determine a context of the user and (ii) determine whether to enable suppression of the user notification based the determined context of the user.

9. A method for providing a notification to a user of a controller of a vehicle, the method comprising:
   determining, by the controller, whether a user notification is to be presented to the user;
   determining, by the controller, a present navigation activity of the user to control navigation of the vehicle;
   determining, by the controller, whether the determined activity of the user is indicative of the user's compliance to a user instruction included in the user notification prior to the presentation of the user notification to the user;
   determining, by the controller, determine whether the navigation activity of the user is indicative of the user's knowledge of the user instruction included in the user notification based on the user's compliance; and
   suppressing, by the controller, the presentation of the user notification to the user in response to a determination that the navigation activity of the user is indicative of the user's knowledge of the user instruction included in the user notification.

10. The method of claim 9, wherein determining whether the determined activity of the user is indicative of the user's knowledge of information included in the user notification comprises determining whether the determined activity of the user is indicative of the user's knowledge of information included in the user notification based on activity rules that have been crowd-sourced from other user notification controllers, wherein each activity rule associates one or more user activities to a corresponding notification.

11. The method of claim 9, wherein determining whether the determined activity of the user is indicative of the user's knowledge of information included in the user notification comprises comparing the determined activity of the user to user activity rules to determine whether the determined activity of the user is associated with the user notification.

12. The method of claim 11, further comprising updating the user activity rules based on historical activity of the user using a machine-learning algorithm.

13. The method of claim 11, wherein determining whether the determined activity of the user is indicative of the user's knowledge of information included in the user notification comprises:
   determining a confidence score of the user's knowledge in response to a determination that the determined activity of the user is associated with the user notification; and
   comparing the confidence score to a reference threshold, wherein suppressing the presentation of the user notification comprises suppressing the presentation of the user notification in response to a determination that the confidence score satisfies a predetermined relationship with the reference threshold.

14. The method of claim 13, wherein determining the confidence score comprises comparing the determined activity of the user to a notification policy database, wherein the notification policy database maps user activities to confidence scores.

15. The method of claim 9, further comprising transmitting a suppression notification to a remote compute device in response to a determination that the determined activity of the user is indicative of the user's knowledge of the information included in the user notification, wherein the suppression notification instructs the remote compute device to suppress the presentation of a local notification by the remote compute device that corresponds to the user notification.

16. One or more non-transitory, computer-readable storage media comprising a plurality of instructions that, when executed by a user notification controller, cause the user notification controller to:
   determine whether a user notification is to be presented to the user of a vehicle;
   determine a present navigation activity of the user to control navigation of the vehicle;
   determine whether the determined activity of the user is indicative of the user's compliance to a user instruction included in the user notification prior to the presentation of the user notification to the user;
   determining, by the controller, determine whether the navigation activity of the user is indicative of the user's knowledge of the user instruction included in the user notification based on the user's compliance; and
   suppress the presentation of the user notification to the user in response to a determination that the navigation activity of the user is indicative of the user's knowledge of the user instruction included in the user notification.

17. The one or more non-transitory, computer-readable storage media of claim 16, wherein to determine whether the determined activity of the user is indicative of the user's knowledge of information included in the user notification comprises to determine whether the determined activity of the user is indicative of the user's knowledge of information included in the user notification based on activity rules that have been crowd-sourced from other user notification controllers, wherein each activity rule associates one or more user activities to a corresponding notification.

18. The one or more non-transitory, computer-readable storage media of claim 16, wherein to determine whether the determined activity of the user is indicative of the user's knowledge of information included in the user notification comprises to compare the determined activity of the user to user activity rules to determine whether the determined activity of the user is associated with the user notification.

19. The one or more non-transitory, computer-readable storage media of claim 18, wherein the plurality of instructions, when executed, further cause the user notification controller to update updating the user activity rules based on historical activity of the user using a machine-learning algorithm.

20. The one or more non-transitory, computer-readable storage media of claim 18, wherein to determine whether the determined activity of the user is indicative of the user's knowledge of information included in the user notification comprises to:
  determine a confidence score of the user's knowledge in response to a determination that the determined activity of the user is associated with the user notification; and
  compare the confidence score to a reference threshold, wherein to suppress the presentation of the user notification comprises to suppress the presentation of the user notification in response to a determination that the confidence score satisfies a predetermined relationship with the reference threshold.

21. The one or more non-transitory, computer-readable storage media of claim 20, wherein to determine the confidence score comprises to compare the determined activity of the user to a notification policy database, wherein the notification policy database maps user activities to confidence scores.

22. The one or more non-transitory, computer-readable storage media of claim 16, wherein the plurality of instructions, when executed, further cause the user notification controller transmit a suppression notification to a remote compute device in response to a determination that the determined activity of the user is indicative of the user's knowledge of the information included in the user notification, wherein the suppression notification instructs the remote compute device to suppress the presentation of a local notification by the remote compute device that corresponds to the user notification.

* * * * *